(12) United States Patent
Hui et al.

(10) Patent No.: US 11,206,442 B2
(45) Date of Patent: Dec. 21, 2021

(54) METHODS AND APPARATUS FOR VIDEO STREAMING WITH IMPROVED SYNCHRONIZATION

(71) Applicant: VISHARE TECHNOLOGY LIMITED, Hong Kong (CN)

(72) Inventors: Ronald Chi-Chun Hui, Hong Kong (CN); Kai Hong So, Hong Kong (CN)

(73) Assignee: VISHARE TECHNOLOGY LIMITED, Hong Kong (CN)

( * ) Notice: Subject to any disclaimer, the term of this patent is extended or adjusted under 35 U.S.C. 154(b) by 162 days.

(21) Appl. No.: 16/618,123

(22) PCT Filed: Aug. 1, 2017

(86) PCT No.: PCT/CN2017/095368
§ 371 (c)(1),
(2) Date: Nov. 28, 2019

(87) PCT Pub. No.: WO2019/023919
PCT Pub. Date: Feb. 7, 2019

(65) Prior Publication Data
US 2020/0177947 A1 Jun. 4, 2020

(51) Int. Cl.
*H04N 5/445* (2011.01)
*G06F 3/00* (2006.01)
*G06F 13/00* (2006.01)
*H04N 21/43* (2011.01)
*H04L 7/00* (2006.01)
(Continued)

(52) U.S. Cl.
CPC ....... *H04N 21/4307* (2013.01); *H04L 7/0004* (2013.01); *H04L 7/0012* (2013.01); *H04L 65/608* (2013.01); *H04N 5/08* (2013.01); *H04N 21/4305* (2013.01)

(58) Field of Classification Search
CPC .. H04N 21/4307; H04N 21/4305; H04N 5/08; H04L 65/608; H04L 7/0012; H04L 7/0004
See application file for complete search history.

(56) References Cited

U.S. PATENT DOCUMENTS

| | | |
|---|---|---|
| 6,914,637 B1 * | 7/2005 | Wolf .................. H04N 21/2383 348/473 |
| 2005/0141620 A1 | 6/2005 | Hattori |

(Continued)

FOREIGN PATENT DOCUMENTS

| CN | 101695090 | 4/2010 |
|---|---|---|
| CN | 102752668 | 10/2012 |

(Continued)

*Primary Examiner* — Gigi L Dubasky
(74) *Attorney, Agent, or Firm* — Eagle IP Limited; Jacqueline C. Lui; Jennifer G. Che

(57) ABSTRACT

A method minimizes audio and video streaming delays between a video source and a video sink. A receiver receives a netsync message from a transmitter that communicates with the video source to receive input video. The netsync message is generated by the transmitter in accordance with the input video and indicates a display pointer of the transmitter. In accordance with the netsync message, the receiver adaptively outputs a set of timing control signals that is transmitted to the video sink, thereby minimizing the latency between the vertical synchronization (VSYNC) of the transmitter and the VSYNC of the receiver.

22 Claims, 6 Drawing Sheets

(51) Int. Cl.
  *H04L 29/06*   (2006.01)
  *H04N 5/08*    (2006.01)

(56) References Cited

U.S. PATENT DOCUMENTS

| | | | | |
|---|---|---|---|---|
| 2013/0287122 A1* | 10/2013 | Mizosoe | ............ | H04N 21/2365 375/240.26 |
| 2014/0086234 A1* | 3/2014 | Ogawa | ................. | H04J 3/0638 370/350 |
| 2016/0196851 A1* | 7/2016 | Cohen | .................... | G11B 27/34 386/201 |
| 2018/0288424 A1* | 10/2018 | LaBosco | ............... | H04L 65/608 |
| 2019/0014237 A1* | 1/2019 | Takahashi | ................ | H04N 5/04 |
| 2020/0045661 A1* | 2/2020 | Verso | ................ | H04W 56/0015 |

FOREIGN PATENT DOCUMENTS

| | | |
|---|---|---|
| CN | 103297808 | 9/2013 |
| CN | 104301767 | 1/2015 |

\* cited by examiner

METHODS AND APPARATUS FOR VIDEO STREAMING WITH IMPROVED SYNCHRONIZATION

FIELD OF THE INVENTION

The present invention relates to video processing, and more particularly to methods and apparatus that execute video streaming with improved vertical synchronization (VSYNC) tracking.

BACKGROUND

Streaming video or streaming media is video or media that is constantly received by and presented to an electronic device or client device while being delivered by a provider. Video data can be encoded and transmitted over the Internet. Rather than having to wait for an entire file being downloaded for viewing, an electronic device can regenerate the video images and audio signal by accessing the data stream while they are being transmitted. Streaming technology is particularly useful in teleconferences, sporting events, radio broadcasts, television broadcasts, and the like.

New methods and apparatus that assist in advancing technological needs and industrial applications in video processing such as video streaming are desirable.

SUMMARY OF THE INVENTION

One example embodiment is a method that minimizes audio and video streaming delays between a video source and a video sink. A receiver receives a netsync message from a transmitter that communicates with the video source to receive input video. The netsync message is generated by the transmitter in accordance with the input video and indicates a display pointer of the transmitter. In accordance with the netsync message, the receiver adaptively outputs a set of timing control signals that is transmitted to the video sink, thereby minimizing the latency between the vertical synchronization (VSYNC) of the transmitter and the VSYNC of the receiver.

Other example embodiments are discussed herein.

DETAILED DESCRIPTION

Figure 1:
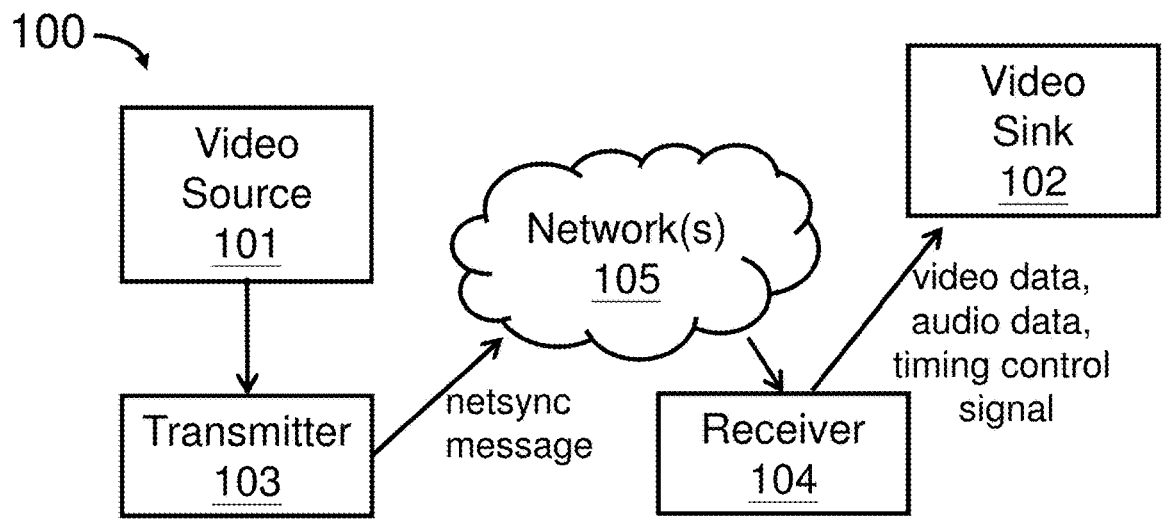
FIG. 1 illustrates a video streaming system in accordance with an example embodiment.

Example embodiments relate to new methods and apparatus that execute video streaming in unconventional ways to improve performance such as synchronization for video processing in the field of video-related technologies and applications.

Video streaming, especially real-time video streaming over networks, requires low delay or latency and high video quality. To reduce frame latency, the start time of a frame of a video sink, such as a display device (e.g., a liquid crystal display (LCD)), is expected to be closely tracked with that of a video source. If the video source and the video sink are connected directly via a video cable, timing control signals like video clock, Vertical Synchronization (VSYNC), and Horizontal Synchronization (HSYNC) can be sent directly from the video source to the video sink, thereby achieving good synchronization.

For many applications, however, a video source communicates with a video sink via one or more networks. In a data network such as a wireless fidelity (WiFi) network, latency and bit error rates are high due to packet collision and interference, so it is impossible to guarantee timely transmission of data such as timing control signals. Conventional schemes have unsatisfactory synchronization during a video streaming process between the video source and the video sink over one or more networks. For example, even though video clocks of the video source and the video sink are set to run at a same predetermined rate, small amount of clock drift can occur in either the video source or the video sink because they are driven by two separate crystals embedded in the two separate devices. Over time, small amounts of clock drift eventually lead to a large deviation for frame start time, resulting in a large frame latency and video stuttering, which further degrades video quality and reliability.

One or more example embodiments solve the above technical problems associated with conventional schemes for video streaming. One or more example embodiments achieve improved performance, such as improved synchronization, video quality, and reliability, in executing video streaming by providing new technical solutions that operate in unconventional ways to contribute to video-related technology.

Example embodiments include unconventional schemes in which a transmitter does not transmit timing control signals of a video source directly over a network to a receiver that communicates with a video sink. Instead, the transmitter generates and inserts a netsync message into a video stream that is transmitted to the receiver. In accordance with the netsync message, the receiver makes adjustment on its timing and creates its own timing control signals that are transmitted to the video sink. As such, example embodiments keep a difference between a start time of a video frame in input video output by the video source and a start time of same video frame that is input into the video sink falling within a safe range, thereby improving synchronization between the video source and the video sink for video streaming. Additionally, improved synchronization contributes to improved video quality and reliability.

Example embodiments include unconventional schemes that track VSYNC of a video source by calculating a pointer difference between a display pointer of a transmitter and a display pointer of a receiver during a video streaming process. The receiver makes adjustment of its VSYNC timing and updates the pointer difference such that the receiver synchronizes with the transmitter.

FIG. 1 illustrates a video streaming system 100 in accordance with an example embodiment. As illustrated, the video streaming system 100 includes a video source 101, a video sink 102, a transmitter 103, and a receiver 104 that communicates with the transmitter 103 via one or more networks 105.

By way of example, the video source 101 can be a video camera, a smartphone, or other electronic devices that output input video or raw video to the transmitter 103. For example, the input video includes video data (e.g., video frames including multiple pixels), audio data, and other data such as timing control signals and various parameters of input video format of the input video.

By way of example, the transmitter 103 is an electronic device that produces radio waves with an antenna, such as an 802.11ad transmitter. The transmitter 103 checks the video format to determine timing control signals of the input video. As an example, the video format definition includes the waveforms of timing control signals that include one or more of video clock, HSYNC, VSYNC, and the definitions of blanking intervals (e.g., vertical blanking intervals and horizontal blanking intervals), etc. To improve synchronization with the video sink 102, instead of transmitting the timing control signals of the input video to the receiver 104, the transmitter 103 embeds video format information into the first netsync message and the display pointer information into all netsync messages, and transmits the netsync messages to the receiver 104. Upon receipt of the netsync message, the receiver 104 improves synchronization by changing the video format parameters for generating timing control signals that are transmitted to the video sink 102. The video sink 102 thus can adjust its own VSYNC timing. By way of example, the video sink 102 can be a smartphone, a computer display, or other electronic devices that receive and display video data for viewing.

Figure 2:
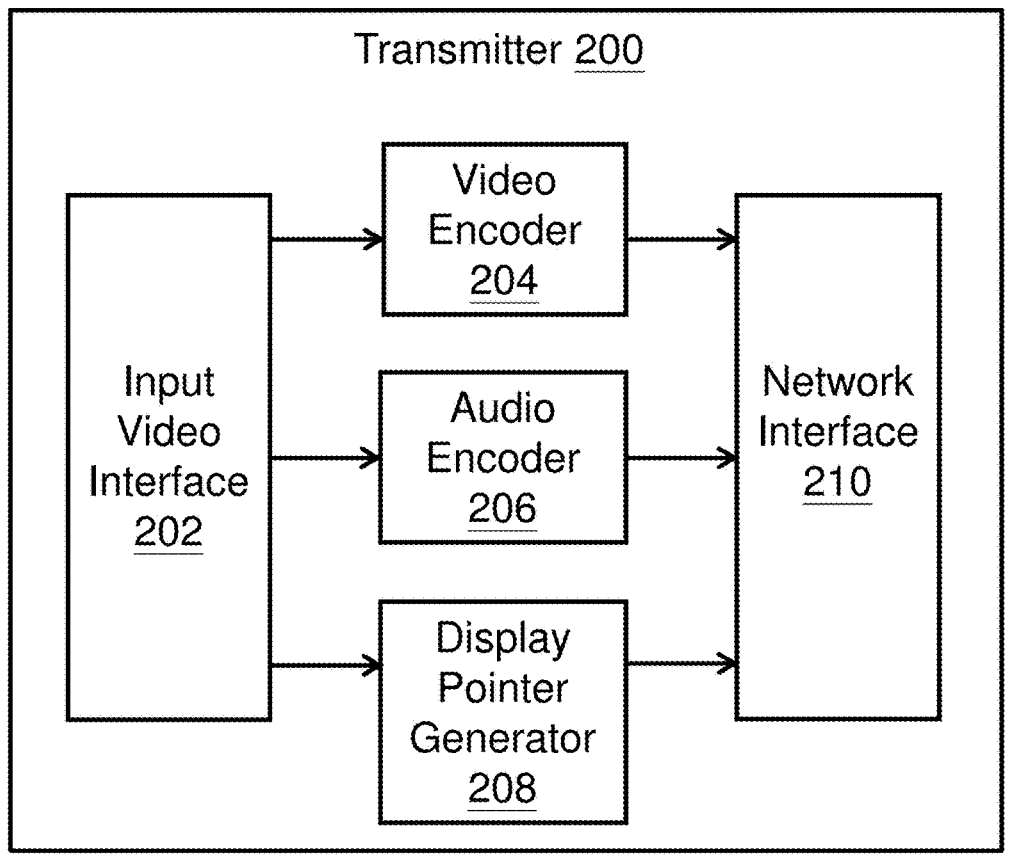
FIG. 2 illustrates a transmitter in accordance with an example embodiment.

FIG. 2 illustrates a transmitter 200 in accordance with an example embodiment. By way of example, the transmitter 200 executes video streaming between a video source and a video sink with improved vertical synchronization (VSYNC) tracking.

As illustrated, the transmitter 200 includes an input video interface 202, a video encoder 204, an audio encoder 206, a display pointer generator 208, and a network interface 210.

By way of example, the input video interface 202 receives input video or raw video from the video source. As an example, the input video includes video data, audio data, and timing controls signals for the input video. The video encoder 204 encodes (e.g., compresses) the video data into encoded video data or video bitstream. The audio encoder 206 encodes (e.g., compresses) the audio data into encoded audio data or audio bitstream.

By way of example, the display pointer generator 208 keeps track of a display pointer of the transmitter 200. As an example, the display pointer generator 208 independently maintains its own display pointer that facilitates the VSYNC tracking between the video source and the video sink.

By way of example, a display pointer includes a frame pointer and a row pointer. Successive video frames or frames are numbered by consecutive integers. The frame pointer identifies the frame that is being processed by the transmitter 200. Successive lines in a video frame or frame are numbered by consecutive integers. The row pointer identifies the line that is being processed by the transmitter 200. The row pointer is reset to '0' for the first line of each frame. The frame pointer and the row pointer together indicate the "video phase" of the transmitter 200. The video phase indicates which fame is being processed and in the meanwhile which line in the fame is being processed.

By way of example, in accordance with the timing control signals for the input video, the display pointer generator 208 updates value of the display pointer to obtain updated value of the display pointer.

By way of example, the network interface 210 receives the updated value of the display pointer from the display pointer generator 208, and generates a netsync message that includes the updated value. The network interface 210 embeds or inserts the netsync message, the video bitstream and the audio bitstream into the same network interface. The network interface 210 transmits the video stream to the receiver over one or more networks, such as packed-based data networks, where the video stream, for example, includes the netsync message, the video bitstream, and the audio bitstream.

In an example embodiment, each netsync message has a sequence number that identifies the netsync message. When more than one netsync message arrives at the receiver (e.g. due to connection backlog), the receiver determines whether a netsync message is the latest netsync message and ignores those netsync messages that are not the latest.

Figure 3:
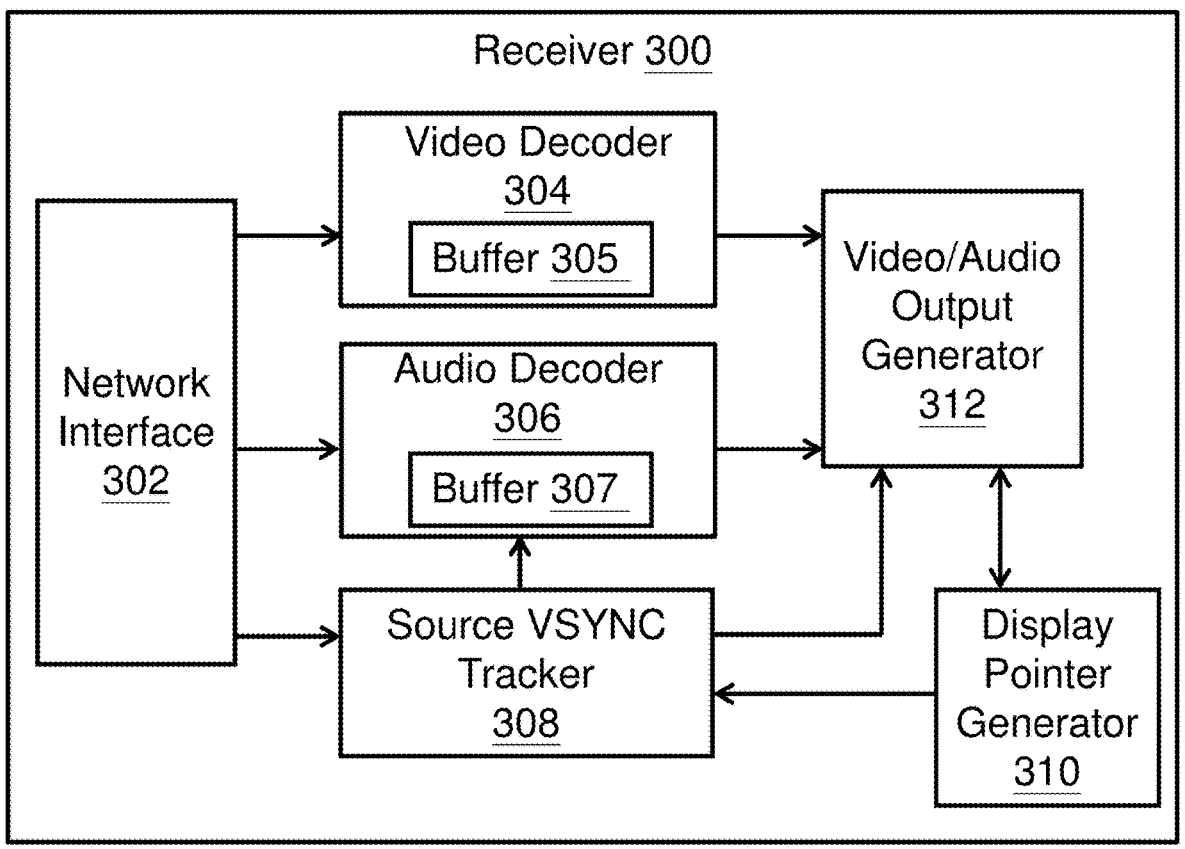
FIG. 3 illustrates a receiver in accordance with an example embodiment.

FIG. 3 illustrates a receiver 300 in accordance with an example embodiment. By way of example, the receiver 300 executes video streaming between a video source and a video sink with improved synchronization, such as improved tracking of VSYNC between the video source and the video sink.

As illustrated, the receiver 300 includes a network interface 302, a video decoder 304, an audio decoder 306, a source VSYNC tracker 308, a display pointer generator 310, and a video/audio output generator 312.

By way of example, the network interface 302 receives a video stream from a transmitter that communicates with the video source. The video stream, for example, includes the encoded video data or video bitstream, the encoded audio data or audio bitstream, and a netsync message. The netsync message is generated by the transmitter and includes timing information such as a display pointer of the transmitter.

By way of example, the video decoder 304 decodes the video bitstream received from the network interface 302 to obtain decoded video data. The audio decoder 306 decodes the audio bitstream received from the network interface 302 to obtain decoded audio data. In some example embodiments, the video decoder 304 include one or more buffers 305 that buffer the decoded video data. The audio decoder 306 include one or more buffers 307 that buffer the decoded audio data.

By way of example, the source VSYNC tracker 308 communicates with the network interface 302 to receive information such as value of a display pointer of the transmitter. By way of example, the source VSYNC tracker 308 also communicates with the display pointer generator 310 to read the value of a display pointer of the receiver. Based on the difference of the display pointer of the transmitter and that of the receiver, the source VSYNC tracker 318 makes decision on whether and how much to change the parameters of the video output format and instructs the video/audio output generator 312 to change the output control signals (e.g., timing control signals) for video and audio accordingly. The source VSYNC tracker 308 further communicates with the audio decoder 306 and instructs the audio decoder 306 to change frequency of audio clock or audio clock frequency to keep synchronization between audio and video data.

By way of example, the display pointer generator 310 keeps track of a display pointer of the receiver 300. In accordance with the netsync message as received, the display pointer generator 310 updates value of the display pointer of the receiver 300.

As an example, the display pointer generator 310 independently maintains its own display pointer based on the receiver video clock to assist VSYNC tracking between the video source and the video sink. As an example, a display pointer includes a frame pointer and a row pointer. The frame pointer identifies the frame that is being processed. The row pointer identifies the line that is being processed in the frame. The frame pointer and the row pointer together indicate the "video phase" of the receiver 300.

By way of example, the video/audio output generator 312 changes VSYNC timing in response to a command received from the source VSYNC tracker 308, and generates a set of timing control signals that is transmitted to the video sink to improve tracking of the VSYNC between the video source and the video sink. For example, the timing control signals include one or more of video clock, Horizontal Synchronization (HSYNC), Vertical Synchronization (VSYNC), and Data Enable (DE).

Figure 4:
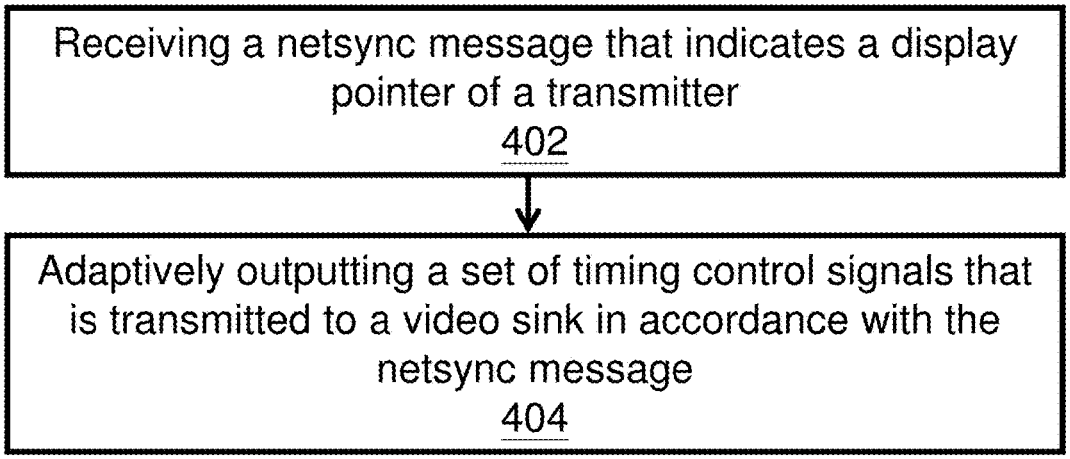
FIG. 4 illustrates a method that improves video streaming in accordance with an example embodiment.

FIG. 4 illustrates a method 400 that improves video streaming in accordance with an example embodiment. The method 400 improves synchronization between a video source and a video sink during a video streaming process. For example, the method 400 minimizes audio and video streaming delays between the video source and a video sink. As an example, the method 400 can be executed by an electronic device, such as the receiver 300 with reference to FIG. 3.

At block 402, a receiver receives a netsync message from a transmitter. For example, the transmitter communicates with the video source to receive input video. The netsync message is generated by the transmitter and indicates a display pointer of the transmitter.

By way of example, in accordance with the input video, the transmitter determines frequency of the input video clock, i.e., It, for video data included in the input video, frequency of the input audio clock for audio data included in the input video, and various parameters of the input video format, such as vertical blanking and horizontal blanking, from the video source, and informs these information to the receiver.

In an example embodiment, a display pointer generator of the transmitter updates the value of its display pointer based on the video clock of the transmitter and the parameters of the input video format.

In an example embodiment, the transmitter sends raw pixels or a compressed pixel bitstream executed by a video encoder and a compressed audio bitstream executed by an audio encoder to the receiver over a network. The transmitter does not, however, send timing control signals (e.g. video clock, HSYNC, VSYNC, DE, etc.) directly to the receiver. Instead, the transmitter transmits the netsync message that includes the display pointer of the transmitter to the receiver.

In an example embodiment, upon receipt of the initialization parameters (e.g., the video and audio clock frequencies, the video output parameters) found in the first netsync message from the transmitter, the receiver sets the frequencies of its video clock and audio clock, and initializes its video/audio output generator accordingly. In an example embodiment, the video clock of the receiver, although set to run at $f_t$, is slightly off from the video clock of the transmitter because the two video clocks are driven by different crystals. The frequency of the video clock of the receiver can be expressed as $f_r=f_t+$delta, where delta is a small nonzero value. In an example embodiment, the audio clock of the receiver is slightly off from the audio clock of the transmitter.

At block 404, in accordance with the netsync message, the receiver adaptively outputs a set of timing control signals that is transmitted to the video sink, thereby minimizing the VSYNC latency between the video source and the video sink.

In an example embodiment, the video stream received by the receiver includes encoded video data (e.g., compressed video bitstream) and encoded audio data (e.g., compressed audio bitstream). As an example, the compressed video bitstream is uncompressed by a video decoder of the receiver to obtain raw pixels. The raw pixels are put into a video data buffer or buffer in the video decoder. The compressed audio bitstream is uncompressed by an audio decoder of the receiver to obtain raw audio data. The obtained raw audio data are put into an audio data buffer or buffer in the audio decoder.

In an example embodiment, the receiver retrieves raw pixels from the video data buffer at a rate of its video clock. The receiver retrieves raw audio data from the audio data buffer at a rate of its audio clock. When the receiver sends the raw pixels and the raw audio data to the video sink, a video/audio output generator of the receiver generates adaptive timing control signals (e.g., video clock, HSYNC, VSYNC, DE, etc.) with variable video clock frequencies and video blanking based on the difference between the display pointers of the transmitter and the receiver.

Figure 5:
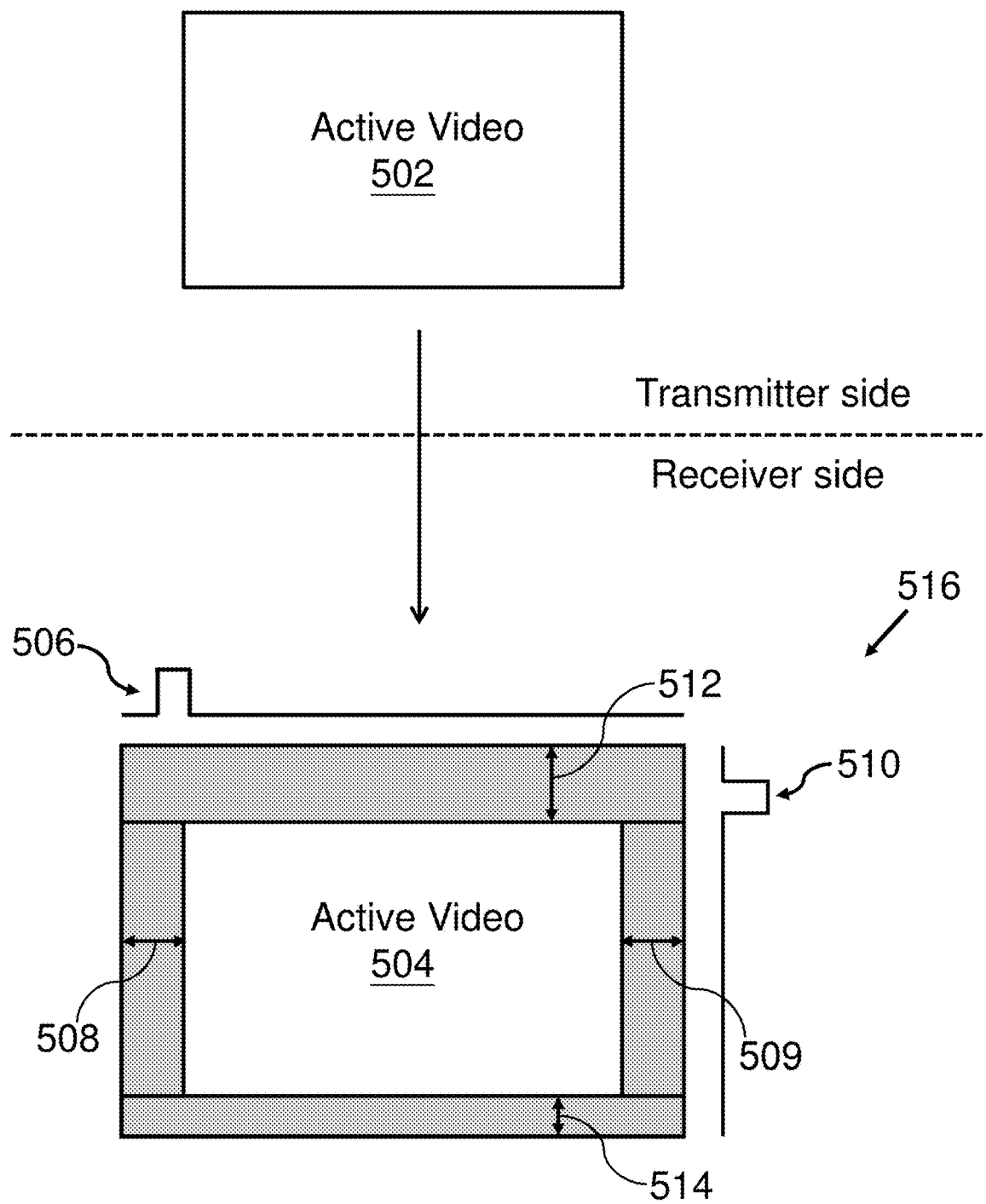
FIG. 5 shows a graph illustrating a process of creating timing control signals at a receiver side in accordance with an example embodiment.

As used herein, "active frame" refers to a frame that is being processed or streamed. The receiver transmits the generated timing control signals to the video sink such that the video sink is well synchronized with the video source for video streaming. By way of example, the receiver creates its own timing control signals as illustrated by graph 500 in FIG. 5. As illustrated by the graph 500, the transmitter transmits active video 502 at a transmitter side to the receiver. As used herein, "active video" refer to a video data that is being processed or streamed. For example, the active video includes one or more video frames or frames that are streamed from the transmitter side to the receiver side.

By way of example, the receiver receives the active video 502 at the receiver side and outputs the video 516 which includes the decoded active video 504 as well as a set of adaptively changing timing control signals. The parameters of the adaptive video output format include video clock frequency, vertical blanking intervals and horizontal blanking intervals. In an example embodiment, a VSYNC pulse denotes the start of a new frame and a HSYNC denotes the start of a new line in a frame. As illustratively shown by the graph 500, for each frame, a VSYNC 510 with variable vertical blanking intervals 512 and 514 are inserted. For each line in the frame, a HSYNC 506 with variable horizontal blanking intervals 508 and 509 are inserted.

In an example embodiment, when executing VSYNC tracking, a source VSYNC tracker of the receiver changes the frequencies of the video clock and the audio clock and parameters in the video/audio output generator of the receiver.

In an example embodiment, in accordance with the timing control signals generated by the video/audio output generator of the receiver, the display pointer generator of the receiver updates value of its display pointer. As an example, at every active edge of HSYNC, the row pointer is incremented by 1. At every active edge of VSYNC, the frame pointer is incremented by 1 and the row pointer is reset to 0.

By way of example, to execute VSYNC tracking between the receiver and the transmitter, upon receipt of the netsync message, the receiver determines a difference between value of a display pointer of the transmitter and value of a display pointer of the receiver to obtain a pointer difference that indicates extent of display latency between the receiver and the transmitter.

Figure 6:
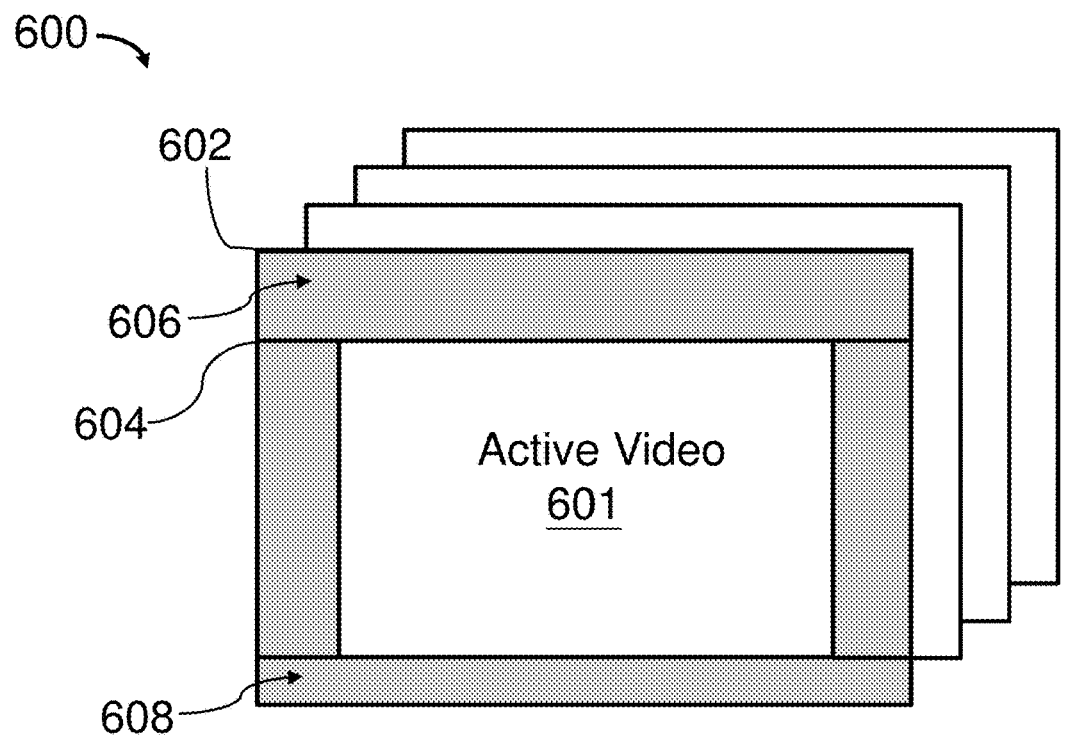
FIG. 6 shows a graph illustrating a display pointer in accordance with an example embodiment

A display pointer, for example, is illustrated by a graph 600 in FIG. 6. The graph 600 illustrates an active video 601, a frame pointer 602 and a row pointer 604 that indicate which frame in the active video 601 and which line in the frame are being processed. The graph 600 further illustrates blanking intervals or blanking 606 and 608.

In an example embodiment, upon receipt of the netsync message, the receiver passes the display pointer of the transmitter detected in the netsync message to a source VSYNC tracker of the receiver. The source VSYNC tracker tracks the VSYNC of the source video (e.g., video data included in the input video or raw video) by calculating and monitoring the difference between the display pointer of the transmitter and the display pointer of the receiver by:

$$\text{pointer difference} =$$
$$\text{transmitter\_display\_pointer} - \text{receiver\_display\_pointer} =$$
$$(\text{transmitter\_frame\_pointer} - \text{receiver\_frame\_pointer}) *$$
$$\text{rows\_per\_frame} + (\text{transmitter\_row\_pointer} - \text{receiver\_row\_pointer})$$

where $$\text{transmitter\_display\_pointer} = \text{transmitter\_frame\_pointer} * \text{rows\_per\_frame} +$$
$$\text{transmitter\_row\_pointer},$$
$$\text{receiver\_display\_pointer} = \text{receiver\_frame\_pointer} * \text{rows\_per\_frame} +$$
$$\text{receiver\_row\_pointer},$$

where "transmitter_display_pointer" and "receiver_display_pointer" represent the display pointers for the transmitter and the receiver respectively. "transmitter_frame_pointer" and "receiver_frame_pointer" represent the frame pointers for the transmitter and the receiver respectively. "transmitter_row_pointer" and "receiver_row_pointer" represent the row pointers for the transmitter and the receiver respectively. "rows_per_frame" refers to how many rows per frame. The value of the pointer difference indicates "how far behind" is the receiver relative to the transmitter in terms of video frame row.

By way of example, the source VSYNC tracker of the receiver makes synchronization adjustments based on the pointer difference. For example, the source VSYNC tracker updates the value of the display pointer of the transmitter when a new netsync message arrives at the receiver. As an example, the display pointer of the receiver is updated according to the adaptively changing video output format generated by the video/audio output generator. As an example, the pointer difference is updated when the display pointer of the transmitter or the display pointer of the receiver changes.

Figure 7:
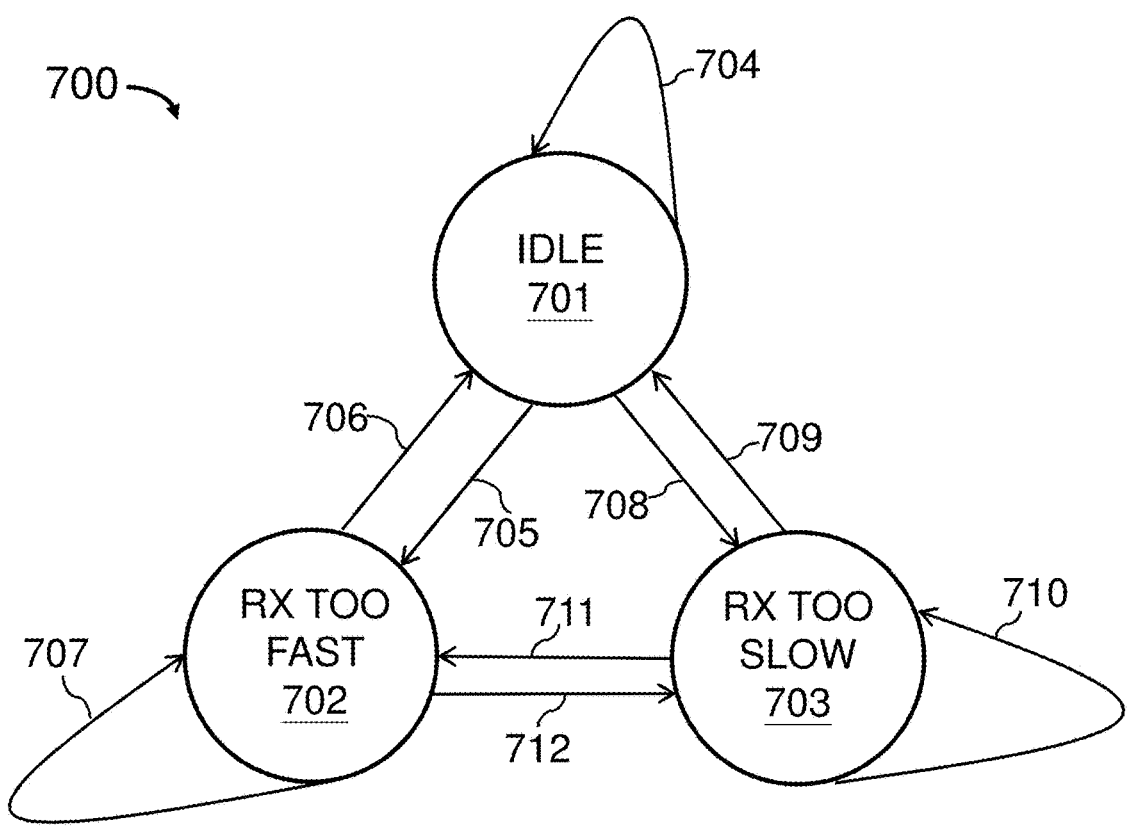
FIG. 7 illustrates a state machine of a source VSYNC tracker of a receiver in accordance with an example embodiment.

FIG. 7 illustrates a state machine 700 of a source VSYNC tracker of a receiver in accordance with an example embodiment.

Circle 701 illustrates an "IDLE" state for the source VSYNC tracker. The "IDLE" state, for example, indicates the VSYNC timing of the receiver falls within an acceptable range or the synchronization between a video source and a video sink is satisfactory for video streaming.

By way of example, when the pointer difference as calculated falls within a range being between a min threshold and a max threshold with both endpoints included (i.e., min threshold pointer difference max threshold), the source VSYNC tracker stays at the "IDLE" state (as indicated by arrow 704). In an example embodiment, the min threshold is 500 us, and the max threshold is 1 ms.

By way of example, when the pointer difference is less than the min threshold (i.e., pointer difference <min threshold), the source VSYNC tracker goes to circle 702 (as indicated by arrow 705). Circle 702 illustrates a "RX TOO FAST" state, which indicates the VSYNC timing of the receiver gets too close to the VSYNC timing of the transmitter. In this situation, VSYNC is expected to be moved back or arrive at the receiver later. By moving back the VSYNC, as an example advantage, there can be enough pixels in the decoder buffer to output to the video sink (e.g., a video display), thereby increasing the video streaming reliability. Upon adjusting VSYNC timing to increase the pointer difference, if the condition of "pointer difference <min threshold" is still satisfied, the source VSYNC tracker stays at the "RX TOO FAST" state (as indicated by arrow 707). If the VSYNC is adjusted such that "min threshold pointer difference max threshold", the source VSYNC tracker goes to the "IDLE" state (as indicated by arrow 706).

By way of example, at circle 701, when the pointer difference is greater than the max threshold (i.e., max threshold <pointer difference), the source VSYNC tracker goes to circle 703 (as indicated by arrow 708). Circle 703 illustrates a "RX TOO SLOW" state, which indicates the VSYNC timing of the receiver lags to the VSYNC timing of the transmitter to an unacceptable extent or the synchronization between the video source and the video sink is unsatisfactory for video streaming. In this situation, VSYNC is expected to be pushed forward or arrive at the receiver sooner. Upon adjusting VSYNC to decrease or reduce the pointer difference, if the condition of "max threshold <pointer difference" is still satisfied, the source VSYNC tracker stays at the "RX TOO SLOW" state (as indicated by arrow 710). If the VSYNC is adjusted such that "min threshold pointer difference max threshold", the source VSYNC tracker goes to the "IDLE" state (as indicated by arrow 709).

By way of example, at circle 703, if the VSYNC is adjusted such that "pointer difference <min threshold", the source VSYNC tracker goes to the "RX TOO FAST" state (as indicated by arrow 711).

By way of example, at circle 702, if the VSYNC is adjusted such that "max threshold <pointer difference", the source VSYNC tracker goes to the "RX TOO SLOW" state (as indicated by arrow 712).

By way of example, the audio clock is adjusted in a similar way.

By way of example, the following pseudo code is given in purpose of facilitating understanding of the state machine of FIG. 7 only:

IDLE:

stop adjusting the VSYNC timing of the receiver;
stop adjusting the audio clock frequency;
update display pointer of the transmitter;
update display pointer of the receiver;
update display pointer difference;
if (display pointer difference > max threshold) then

```
    state = RX_TOO_SLOW;
  else if (display pointer difference < min threshold) then
    state =RX_TOO_FAST;
  else /* min threshold ≤ display pointer difference ≤ max threshold */
    state = IDLE;
  end if
```

RX_TOO_SLOW:

```
  send a command to Video/Audio Output Generator to increase the
advancing rate of the display pointer of the receiver;
  send a command to the Audio Decoder to increase the speed
  of the audio clock;
  update display pointer of the transmitter;
  update display pointer of the receiver;
  update display pointer difference;
  if (display pointer difference > max threshold) then
    state =RX_TOO_SLOW;
  else if (display pointer difference < min threshold) then
    state =RX_TOO_FAST;
  else /* min threshold ≤ display pointer
  difference ≤ max threshold */
    state = IDLE;
  end if
```

RX_TOO_FAST:

```
  send a command to Video/Audio Output Generator to decrease the
advancing rate of the display pointer of the receiver;
  send a command to the Audio Decoder to decrease
  the speed of the audio clock;
  update display pointer of the transmitter;
  update display pointer of the receiver;
  update display pointer difference;
  if (display pointer difference > max threshold) then
    state =RX_TOO_SLOW;
  else if (display pointer difference < min threshold) then
    state =RX_TOO_FAST;
  else /* min threshold ≤ display pointer difference max threshold */
    state = IDLE;
  end if
```

By way of example, there are various ways to change the advancing rate of the display pointer of the receiver and thus the VSYNC timing. In an example embodiment, the receiver adjusts a frequency of a video clock or video clock frequency of the receiver such that the timings and frequencies of occurrence for VSYNC and HSYNC are changed. As an example, running the video clock of the receiver faster makes the HSYNC and VSYNC occur more frequently in the receiver, which in turn makes the display pointer of the receiver increment faster. As such, the pointer difference becomes smaller over time. As another example, running the video clock of the receiver slower makes the HSYNC and VSYNC occur less frequently in the receiver, which in turn makes the display pointer of the receiver increment slower. As such, the pointer difference becomes larger over time.

Figure 8:
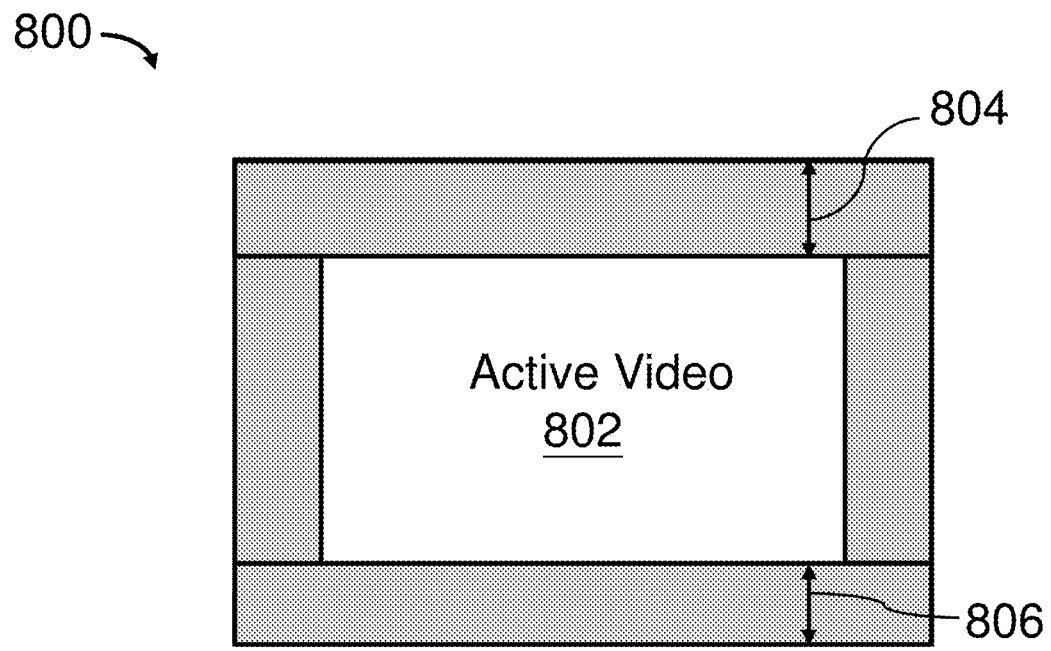
FIG. 8 shows a graph illustrating adjustment of VSYNC timing of a receiver by adjusting vertical blanking intervals in accordance with an example embodiment.

In another example embodiment, the receiver changes the advancing rate of its display pointer by adaptively changing blanking intervals. FIG. 8 shows a graph 800 illustrating adjustment of VSYNC timing of a receiver by adjusting vertical blanking intervals in accordance with an example embodiment. As illustrated, the receiver manipulates the timing of next VSYNC by expanding or shrinking vertical blanking intervals 804 and 806 for the active video 802.

By way of example, each of the vertical blanking intervals 804 and 806 includes multiple lines (also called blanking lines). The number of the blanking lines can be adjusted. As an example, decreasing the number of blanking lines of a video frame shortens the frame period, which in turn moves forward in time the next VSYNC. As such, the value of the display pointer takes a sudden increase when the last blanking line of a frame is outputted, which in turn makes the pointer difference smaller. As another example, increasing the number of blanking lines of a video frame lengthens the frame period, which in turn pushes back in time the next VSYNC. As such, the value of the display pointer takes a sudden decrease when the last blanking line of a frame is outputted, which in turn makes the pointer difference larger.

By way of example, adjustment to video clock and audio clock frequencies or vertical blanking intervals are made gradually so that there are no abrupt transitions in a displayed video (e.g., video displayed by a video sink). For example, if the source VSYNC tracker of the receiver determines that many extra blanking lines need to be added, then these extra blanking lines are spread evenly across many frames. If a large change in video clock frequency is necessary, then the change is broken up into multiple small changes spaced over a period of time.

By way of example, adjustment to video clock frequency is made immediately, while increasing or decreasing blanking lines is delayed until the receiver begins sending the vertical blanking lines to the video sink.

In an example embodiment, to adjust VSYNC timing of the receiver, the receiver adjusts a frequency of an audio clock or audio clock frequency of the receiver. The receiver adjusts a frequency of an audio clock or audio clock frequency to keep audio timing in synchronization with video timing.

Figure 9:
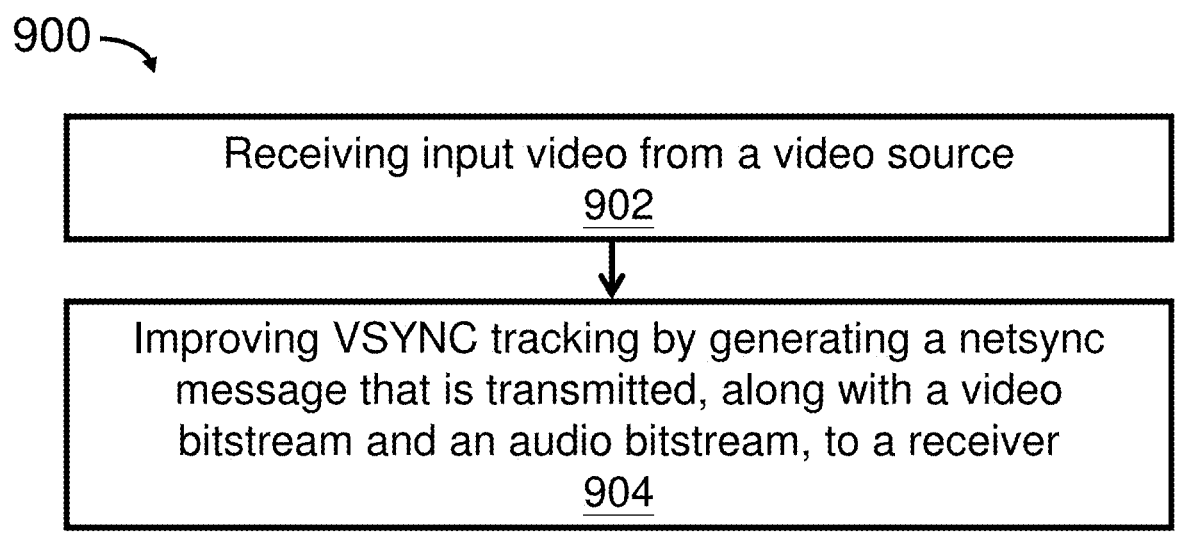
FIG. 9 illustrates a method that executes VSYNC tracking in accordance with an example embodiment.

FIG. 9 illustrates a method 900 that executes VSYNC tracking in accordance with an example embodiment. The method 900 improves the VSYNC tracking between a video source and a video sink during a video streaming process. As an example, the method 900 can be executed by an electronic device, such as the transmitter 200 with reference to FIG. 2.

At block 902, the transmitter receives input video from the video source. As an example, the input video includes a video bitstream and an audio bitstream. As another example, the input video includes timing information (e.g. timing controls signals for the input video).

At block 904, the transmitter generates a netsync message in accordance with the input video. The netsync message is transmitted, along with a video bitstream and an audio bitstream, to a receiver that communicates with the video sink. For example, the netsync message includes a value of a display pointer of the transmitter such that the receiver adjusts VSYNC timing of the receiver to keep difference between a start time of the video frame in the input video and a start time of same video frame that is input into the video sink falling within a predetermined range, thereby preventing the difference drifting apart or collapsing over time. As such, a large video latency and stuttering can be avoided.

In an example embodiment, the transmitter attempts to send the netsync message to the receiver at regular intervals. In another example embodiment, due to network interference, packet error and media access contention, etc., actual reception time of the netsync message by the receiver is random.

In an example embodiment, the transmitter sends a hold message to the receiver to stop the receiver from outputting a new video frame to the video sink.

In an example embodiment, the transmitter sends a hold message to the receiver to stop the receiver from increasing value of the display pointer of the receiver.

In an example embodiment, the transmitter sends a wake message to the receiver to prompt the receiver to output a new video frame to the video sink.

In an example embodiment, the transmitter sends a wake message to the receiver to prompt the receiver to increase value of the display pointer of the receiver.

Figure 10:
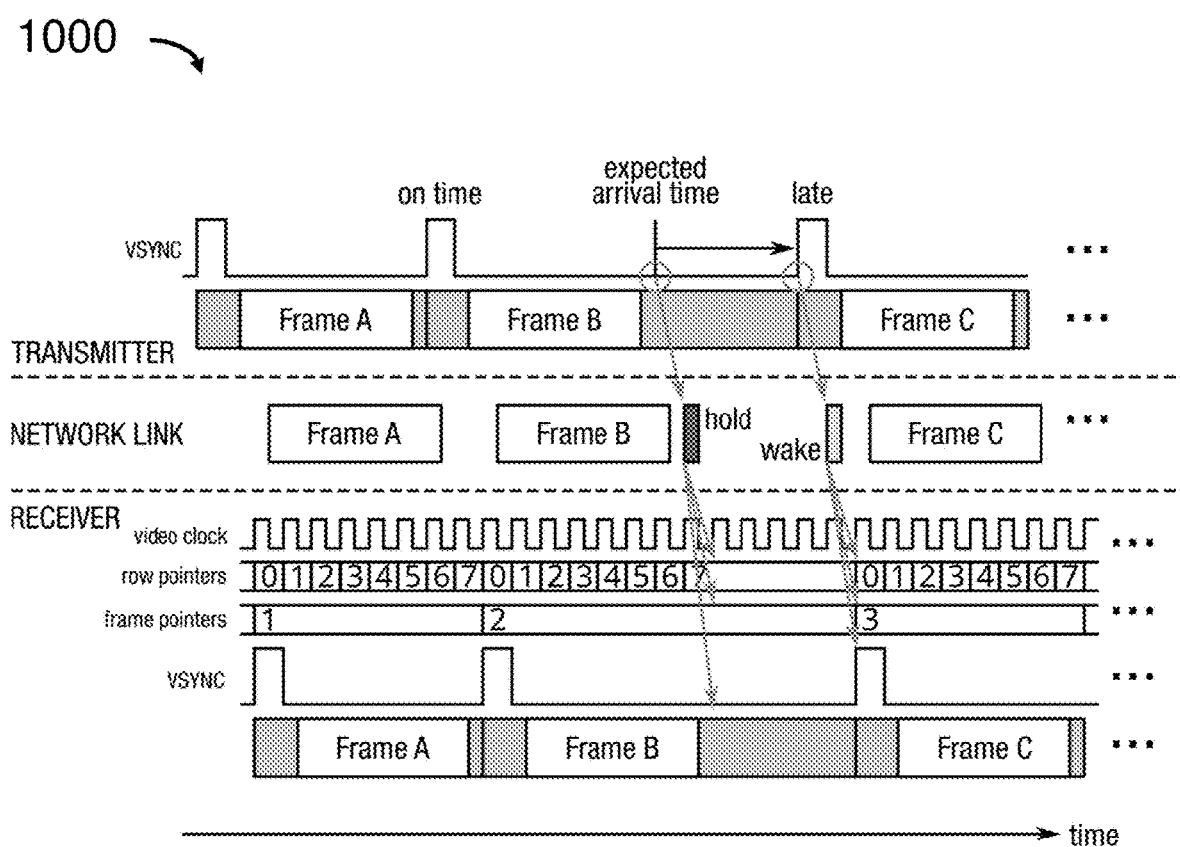
FIG. 10 shows a graph illustrating a hold/wake mechanism in accordance with an example embodiment.

FIG. 10 shows a graph 1000 illustrating a hold/wake mechanism in accordance with an example embodiment.

By way of example, a video source supports a variable refresh rate (VRR) technology such as Adaptive-Sync or Freesync. The timing of the video source's VSYNCs is not regular but varies on a frame-by-frame basis. As illustrated by the graph 1000 in FIG. 10, whenever the transmitter cannot detect a VSYNC at the expected time, the transmitter stops the receiver from updating a display pointer of the receiver with a hold message. When the VSYNC does eventually arrive at the receiver, the transmitter tells or prompts the receiver to resume updating a display pointer of the receiver with a wake message.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures.

As used herein, a "display pointer" indicates a video phase of a transmitter or a receiver. For example, the display pointer can indicate which video frame or frame is being processed, and which line in the frame is being processed.

As used herein, a "hold message" is a data packet or some data embedded in video, audio or other packets; it includes information to instruct an electronic device, such as a receiver, to stop taking an action.

As used herein, a "netsync message" contains a display pointer for an electronic device, such as a transmitter. The "netsync message" can be an individual packet, or can be embedded in a video packet or an audio data packet.

As used herein, a "receiver" is an electronic device or receiving end of a communications channel. As an example, the receiver can be an electronic device that converts a signal from a modulated radio wave into usable information.

As used herein, a "transmitter" is an electronic device or transmitting end of a communications channel. As an example, the transmitter can be an electronic device which produces radio waves with an antenna.

As used herein, a "video clock" is the clock that synchronizes the input and output of various video signals, including VSYNC, HSYNC, DE and video pixels.

As used herein, an "audio clock" is the clock that synchronizes the input and output of various signals, including channel select and audio samples.

As used herein, a "video source" is an electronic device that produces raw video, such as raw video frames.

As used herein, a "video sink" is an electronic device that receives video data and audio data for viewing.

As used herein, a "wake message" is a data packet or some data embedded in video, audio or other packet; it includes information to instruct an electronic device, such as a receiver, to start taking an action.

What is claimed is:

1. A method that minimizes audio and video streaming delays between a video source and a video sink, comprising:
   receiving, by a receiver that communicates with the video sink, a netsync message from a transmitter that communicates with the video source to receive input video, the netsync message being generated by the transmitter in accordance with the input video and indicating a display pointer of the transmitter; and
   minimizing a latency between vertical synchronization (VSYNC) of the transmitter and VSYNC of the receiver by adaptively outputting, by the receiver and in accordance with the netsync message, a set of timing control signals that is transmitted to the video sink.

2. The method of claim 1, further comprising:
updating, by the receiver that includes a display pointer having a frame pointer and a row pointer and in accordance with the timing control signals, a value of the display pointer of the receiver.

3. The method of claim 1, further comprising:
providing the netsync message that includes a value of the display pointer of the transmitter;
calculating, by the receiver, a difference between the value of the display pointer of the transmitter and a value of a display pointer of the receiver to obtain a pointer difference; and
reducing the latency by decreasing, by the receiver and when the pointer difference is greater than a max threshold, the pointer difference.

4. The method of claim 1, further comprising:
providing the netsync message that includes a value of the display pointer of the transmitter;
calculating, by the receiver, a difference between the value of the display pointer of the transmitter and a value of a display pointer of the receiver to obtain a pointer difference; and
increasing, by the receiver and when the pointer difference is greater than a max threshold, a frequency of an audio clock of the receiver.

5. The method of claim 1, further comprising:
providing the netsync message that includes a value of the display pointer of the transmitter;
calculating, by the receiver, a difference between the value of the display pointer of the transmitter and a value of a display pointer of the receiver to obtain a pointer difference; and
increasing, by the receiver and when the pointer difference is less than a min threshold, the pointer difference.

6. The method of claim 1, further comprising:
providing the netsync message that includes a value of the display pointer of the transmitter;
calculating, by the receiver, a difference between the value of the display pointer of the transmitter and a value of a display pointer of the receiver to obtain a pointer difference; and
decreasing, by the receiver and when the pointer difference is less than a min threshold, a frequency of an audio clock of the receiver.

7. The method of claim 1, further comprising:
adjusting, by the receiver and in accordance with the netsync message, vertical synchronization (VSYNC) timing of the receiver by adjusting a frequency of a video clock of the receiver such that timings and frequencies of occurrence for VSYNC and horizontal synchronization (HSYNC) are changed.

8. The method of claim 1, further comprising:
adjusting, by the receiver and in accordance with the netsync message, vertical synchronization (VSYNC) timing of the receiver by adjusting a number of lines in vertical blanking intervals of a video frame.

9. The method of claim 1, further comprising:
adjusting, by the receiver and in accordance with the netsync message, vertical synchronization (VSYNC) timing of the receiver by adjusting a frequency of a video clock of the receiver; and
adjusting, by the receiver, a frequency of an audio clock of the receiver to keep audio timing in synchronization with video timing.

10. The method of claim 1, further comprising:
providing a sequence number in the netsync message; and
determining, by the receiver and in accordance with the sequence number, whether the netsync message is a latest netsync message that is transmitted to the receiver by the transmitter.

11. A transmitter that executes video streaming between a video source and a video sink with improved vertical synchronization (VSYNC) tracking, comprising:
an input video interface that receives input video from the video source, the input video including video data, audio data, and timing control signals for the input video;
a video encoder that communicates with the input video interface and encodes the video data into encoded video bitstream;
an audio encoder that communicates with the input video interface and encodes the audio data into encoded audio bitstream;
a display pointer generator that keeps track of a display pointer of the transmitter and updates value of the display pointer in accordance with the timing control signals for the input video to obtain updated value of the display pointer; and
a network interface that generates a netsync message that includes the updated value of the display pointer, and transmits the encoded video bitstream, the encoded audio bitstream and the netsync message to a receiver that communicates with the video sink such that the video streaming is executed with improved VSYNC tracking between the video source and the video sink.

12. The transmitter of claim 11, wherein the display pointer includes a frame pointer and a row pointer, the frame pointer being an integer and identifying a frame that is processed, the row pointer being an integer and identifying a line that is processed in the frame.

13. A receiver that executes video streaming between a video source and a video sink with improved tracking of vertical synchronization (VSYNC), comprising:
a network interface that receives a video stream from a transmitter that communicates with the video source, the video stream including a video bitstream, an audio bitstream, and a netsync message that indicates a display pointer of the transmitter;
a video decoder that decodes the video bitstream to obtain decoded video data;
an audio decoder that decodes the audio bitstream to obtain decoded audio data;
a source vertical synchronization (VSYNC) tracker that adaptively changes parameters of an output format of video and audio, and instructs a video/audio output generator to change output control signals for video and audio accordingly;
a display pointer generator that updates a display pointer of the receiver according to a local video clock; and
the video/audio output generator that changes VSYNC timing in response to a command received from the source VSYNC tracker, and adaptively generates a set of timing control signals that is transmitted to the video sink to improve tracking of the VSYNC between the video source and the video sink, and changes a frequency of an audio clock to keep the audio in sync with the video.

14. The receiver of claim 13, wherein the video decoder includes a buffer that buffers the decoded video data.

15. The receiver of claim 13, wherein the audio decoder includes a buffer that buffers the decoded audio data.

16. The receiver of claim 13, wherein the timing control signals include one or more of video clock, Horizontal Synchronization (HSYNC), and Vertical Synchronization (VSYNC).

17. A method that executes vertical synchronization (VSYNC) tracking between a video source and a video sink during video streaming, comprising:
receiving, by a transmitter and from the video source, input video that includes a video bitstream and an audio bitstream; and
improving the VSYNC tracking by generating, by the transmitter, a netsync message that is transmitted, along with the video bitstream and the audio bitstream, to a receiver that communicates with the video sink, the netsync message including a value of a display pointer of the transmitter such that the receiver adjusts VSYNC timing of the receiver to keep a difference between a start time of a video frame in the input video and a start time of a video frame that is input into the video sink falling within a predetermined range.

18. The method of claim 17, further comprising:
sending, by the transmitter, a hold message to the receiver to stop the receiver from outputting a new video frame to the video sink.

19. The method of claim 17, further comprising:
sending, by the transmitter, a hold message to the receiver to stop the receiver from increasing a value of a display pointer of the receiver.

20. The method of claim 17, further comprising:
sending, by the transmitter, a wake message to the receiver to prompt the receiver to output a new video frame to the video sink.

21. The method of claim 17, further comprising:
sending, by the transmitter, a wake message to the receiver to prompt the receiver to increase a value of a display pointer of the receiver.

22. The method of claim 17, further comprising:
sending, by the transmitter and when the transmitter cannot detect an arrival of VSYNC, a hold message to the receiver to stop the receiver from updating a value of a display pointer of the receiver; and
sending, by the transmitter and when the transmitter detects an arrival of a new VSYNC, a wake message to prompt the receiver to resume updating of the value of the display pointer of the receiver.

* * * * *